Patented Jan. 9, 1945

2,367,037

UNITED STATES PATENT OFFICE 2,367,037

SULPHONAMIDE DERIVATIVES OF 4-AMINO-1,2,4-TRIAZOLE AND PROCESSES FOR THEIR PRODUCTION

Harry W. Marson, Middletown, Conn., assignor to American Cyanamid Company, New York, N. Y., a corporation of Maine No Drawing. Application July 31, 1942,
Serial No. 453,034

11 Claims. (Cl. 260—239.6)

This invention relates to a new class of chemical compounds and methods for their preparation. More particularly it relates to sulphonamide derivatives of 4-amino-1,2,4-triazole.

This new class of chemical compounds may be represented by the following formula:

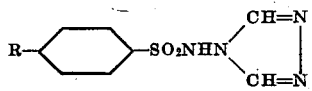

in which R is an amino radical, a radical hydrolyzable to an amino group, including acylamino groups, wherein acyl refers to the residue of an organic carboxylic acid or groups reducible to an amino group including nitro groups.

Some of the compounds of this invention are bacteriostatic and hence may be used as chemotherapeutic agents. They may also be used in intermediates for the preparation of other compounds, such as pharmaceuticals and particularly azo dyestuffs.

The compounds of the present invention may be prepared by reacting a p-substituted benzene sulphonyl halide with 4-amino-1,2,4-triazole in which the p-substituent is a radical convertible into an amino group, including those such as nitro and acylamino radicals. These reaction products may then be converted into the compounds of the general formula in which R is an amino group by hydrolysis of the acylamino group or by reduction of the nitro group. Preferably the reaction between 4-amino-1,2,4-triazole and the sulphonyl halide is carried out in an organic liquid medium, such as acetone, isopropyl alcohol, tertiary butyl alcohol, dioxane, or the like. In this reaction a hydrogen halide is liberated and in some instances it may be desirable to provide a basic reaction medium which will unite with the hydrogen halide evolved. This may be effected by carrying out the reaction in a suitable medium and adding an excess of sodium hydroxide or other alkali hydroxide or in some instances the reaction may be carried out in the presence of a basic reaction medium, such as pyridine, trimethylamine or quinoline, etc. in which case it is not necessary to add the sodium hydroxide.

The invention will be described in greater detail in conjunction with the following specific examples, which, however, are merely illustrative of the preferred methods of preparing representative compounds of the class and are not intended to limit the scope of the invention. The parts are by weight except in the case of liquids which are expressed in corresponding parts by volume.

EXAMPLE 1

*Preparation of 4-acetylsulphanilamido-1,2,4-triazole*

To a solution of 7.5 parts of 4-amino-1,2,4-triazole in 25 parts of anhydrous pyridine kept at 40° C. is added slowly and with stirring 23 parts of acetylsulphanilyl chloride. The reaction mixture is heated 1.5 hours longer at 55° C., dispersed in 75 parts of ice water, and allowed to stand. Filter and extract the product with 10% sodium hydroxide solution. Neutralize the extract with concentrated hydrochloric acid solution, filter, and recrystallize the product from 75% dilute aqueous acetone solution several times using activated carbon black.

EXAMPLE 2

*Preparation of 4-sulphanilamido-1,2,4-triazole*

A suspension of 5 parts of acetylsulphanilamido-triazole from Example 1 in a solution of 10 parts of concentrated hydrochloric acid solution in 50 parts of 95% ethanol is heated to boiling for five minutes. Cool the resulting solution to 0° C. and neutralize with 40% sodium hydroxide solution. Cool in refrigerator. Filter and concentrate the filtrate to obtain fraction of product. Purify the product by recrystallizing repeatedly from aqueous acetone.

In Example 1 p-acetylaminobenzenesulphonyl chloride was used in carrying out the reaction and is the preferred acyl compound because of its cheapness and availability. However, it is to be understood that other acyl compounds of organic carboxylic acids may be used including those such as propionyl, butyryl, benzoyl, nicotinyl, and the like. Similarly, instead of p-acetylaminobenzenesulphonyl chloride, the corresponding p-acetylaminosulphonyl bromide may be used.

In Example 1, p-nitrobenzenesulphonyl chloride or bromide may be used instead of the p-acetylamino compound, in which instance the corresponding p-nitrobenzenesulphonyl triazole is obtained. The p-nitro compound thus obtained can be reduced to the p-amino compound by any one of several reduction methods well known in the art.

When desired, the alkali metal, alkaline earth metal, or other metal salts of 4-sulphanilamido-1,2,4-triazole may be prepared in accordance with the procedures normally employed for preparing salts of sulphonamides. The alkali metal and alkaline earth metal salts, for example, may be prepared by direct treatment with the appropriate alkali metal or alkaline earth metal hydroxide. Salts of the heavy metals, copper, iron, gold, etc., can be obtained by treatment of the alkali metal salts with water-soluble inorganic salts of the appropriate metal.

It is obvious that the above description and examples are intended to be illustrative only and that they may be varied or modified to a considerable extent without departing from the spirit of the invention or sacrificing the advantages thereof. I do not, therefore, intend to limit myself to the specific embodiments herein set forth except as indicated in the appended claims.

What I claim is:

1. A compound of the group consisting of those represented by the following formula and salts thereof:

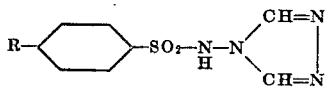

in which R is a member of the group consisting of amino radicals, radicals hydrolyzable to an amino group and radicals reducible to an amino group.

2. The compound 4-p-nitrobenzenesulphonamido-1,2,4-triazole.

3. The compound 4-p-acetylaminobenzenesulphonamido-1,2,4-triazole.

4. The compound 4-sulphanilamido-1,2,4-triazole.

5. The process which comprises reacting a p-X-benzene-$SO_2$ halogen with 4-amino-1,2,4-triazole in which X represents a radical of the group consisting of radicals hydrolyzable to an amino group and radicals reducible to an amino group.

6. The process which comprises reacting a p-acylaminobenzenesulphonyl halide with 4-amino-1,2,4-triazole.

7. The process which comprises reacting a p-acetylaminobenzenesulphonyl halide with 4-amino-1,2,4-triazole.

8. The process which comprises reacting a p-acylaminobenzenesulphonyl halide with 4-amino-1,2,4-triazole and subsequently hydrolyzing to give 4-sulphanilamido-1,2,4-triazole.

9. The process which comprises reacting p-acetylaminobenzenesulphonyl chloride with 4-amino-1,2,4-triazole and subsequently hydrolyzing to give 4-sulphanilamido-1,2,4-triazole.

10. The process which comprises hydrolyzing a 4-p-acylaminobenzenesulphonamido-1,2,4-triazole to give 4-sulphanilamido-1,2,4-triazole.

11. The process which comprises hydrolyzing 4-p-acetylaminobenzenesulphonamido-1,2,4-triazole to give 4-sulphanilamido-1,2,4-triazole.

HARRY W. MARSON.